United States Patent [19]

Cummings

[11] Patent Number: 4,990,092
[45] Date of Patent: Feb. 5, 1991

[54] TALKING BOOK

[75] Inventor: Charles A. Cummings, Cincinnati, Ohio

[73] Assignee: Tonka Corporation, Minnetonka, Minn.

[21] Appl. No.: 393,511

[22] Filed: Aug. 14, 1989

[51] Int. Cl.⁵ .............................................. G09B 5/00
[52] U.S. Cl. ..................................... 434/317; 434/339; 40/455
[58] Field of Search ............... 434/317, 339, 335, 308; 40/455

[56] References Cited

U.S. PATENT DOCUMENTS

| | | |
|---|---|---|
| 2,997,306 | 8/1961 | Hicks .............................. 434/317 X |
| 3,086,297 | 4/1963 | Kay . |
| 3,220,126 | 11/1965 | Gabrielson ................... 434/317 X |
| 3,540,132 | 11/1970 | Glass et al. .......................... 434/317 |
| 3,553,851 | 1/1971 | Paige . |
| 3,592,098 | 7/1971 | Zadig . |
| 3,648,387 | 3/1972 | Lahr . |
| 3,738,021 | 6/1973 | Hino et al. ........................ 434/317 |
| 4,021,932 | 5/1977 | Lipps . |
| 4,273,538 | 6/1981 | Ross . |
| 4,425,098 | 1/1984 | Döring .............................. 434/317 |
| 4,703,573 | 11/1987 | Montgomery et al. . |
| 4,706,536 | 11/1987 | Sanders . |
| 4,752,230 | 6/1988 | Shimizu . |
| 4,755,789 | 7/1988 | Paschal . |
| 4,778,391 | 10/1988 | Weiner . |
| 4,809,246 | 2/1989 | Jeng .................................. 434/317 |
| 4,884,974 | 12/1989 | DeSmet ............................ 434/317 |

Primary Examiner—Robert Bahr
Assistant Examiner—Jennifer L. Doyle
Attorney, Agent, or Firm—Marshall, O'Toole, Gerstein, Murray & Bicknell

[57] ABSTRACT

A talking book including a power source, switches, voice chips and speaker, all of which are mounted within the book and act together to "read" the words written on pages of the book. The switches are pressure-sensitive types, and marked areas on the pages are pressed in order to activate the switches and the chips in order to produce words or other sounds.

22 Claims, 2 Drawing Sheets

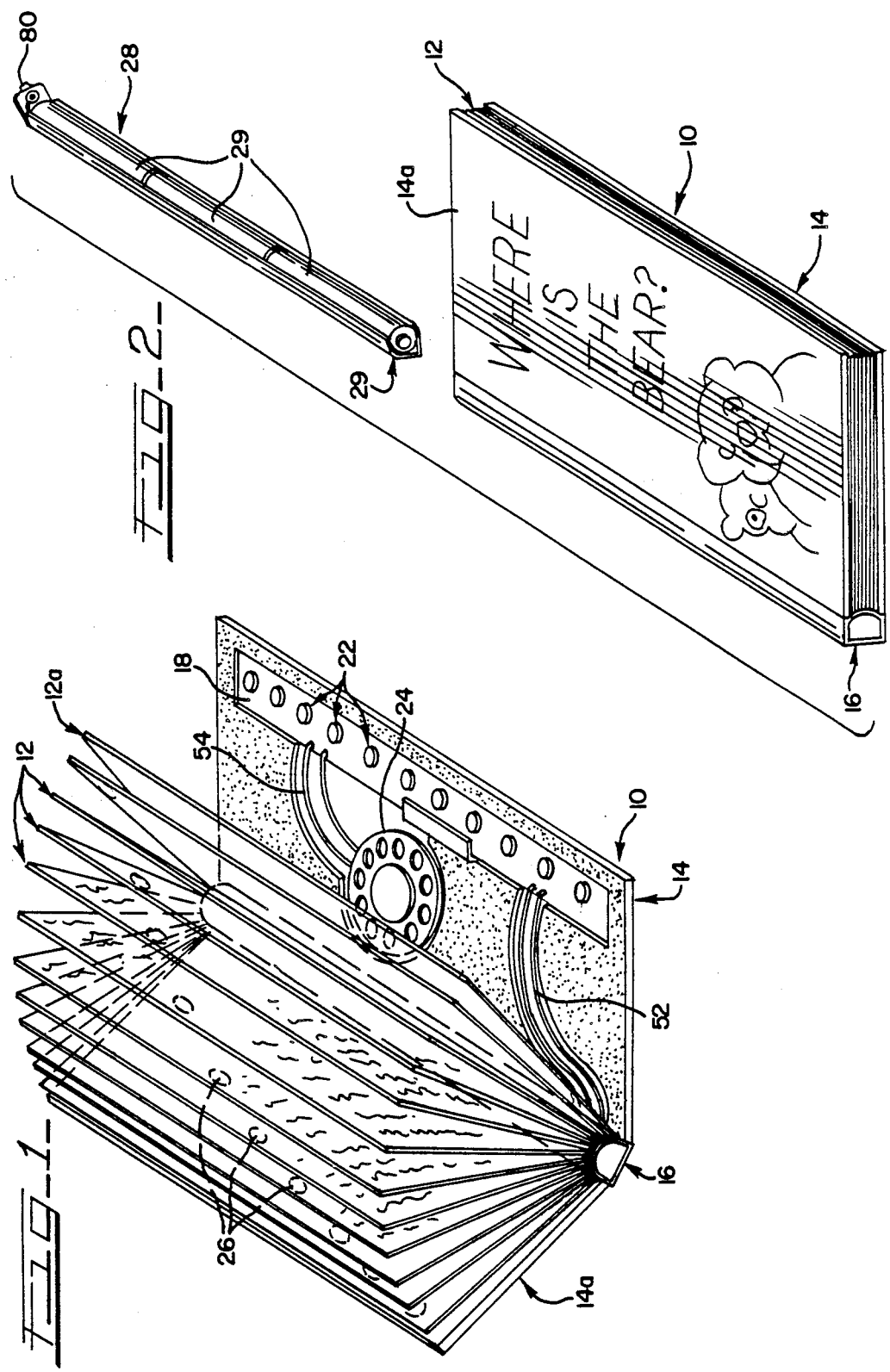

4,990,092

TALKING BOOK

FIELD AND BACKGROUND OF THE INVENTION

This invention relates generally to talking books particularly for children and, more particularly, to an improved talking book having a self-contained power source, voice chip and speaker. A talking book is a book capable of "reading" to the user the printed words on its pages, or of providing sounds that correspond to pictures on its pages.

Talking books are known in the prior art but they have not been entirely satisfactory. For example, early attempts at designing talking books required separate player units to be used in conjunction with a book. Examples of such arrangements can be seen in U.S. Pat. Nos. 3,086,297, 3,553,851 and 4,021,932. U.S. Pat. No. 4,778,391 shows a book which requires a separate power source and sound playback unit but incorporates a voice generating system in the book.

A self-contained book has also been provided as shown in U.S. Pat. No. 4,752,230, but the unit shown therein is operated by punching buttons similar to a touch-tone phone. The buttons are accessible at all points in the book through cut-outs in the pages. This arrangement is disadvantageous because cut-outs have to be formed in all of the pages, and a relatively complex button pressing procedure is required.

The sound producing mechanism may "read" the written words on a page rather than have a single word spoken or a single sound made, and a talking book of this type can be seen in U.S. Pat. No. 4,703,573.

Talking books are useful both for entertainment and in teaching young children how to read. It is, therefore, desirable for a talking book to be easy to use. As has been noted, many of the prior talking books required the use of separate audio player units which are difficult for many young people to manipulate. U.S. Pat. No. 4,273,538 discloses a book having lines of text with magnetic strips located below the words, but in order to make the book "talk," the user must slide a "pick-up member" over a magnetic strip with the proper pressure and speed to operate the book satisfactorily.

SUMMARY OF THE INVENTION

It is a general object of this invention to provide an improved talking book which avoids the foregoing problems. A talking book in accordance with this invention offers significant improvements over the prior art by providing a book with a completely self-contained power source, voice chips and an audio unit. A voice chip is activated when a mark on one of the book's pages is pressed, thereby activating a switch in a cover, which energizes the voice chip. Once this actuation takes place, the voice chip operates the audio unit which produces a synthesized sound. The words on a page may thus be "read" or sounds may be made which correspond to the pictures on the page.

BRIEF DESCRIPTION OF THE DRAWINGS

The invention will be better understood from the following detailed description taken in conjunction with the accompanying figures of the drawings, wherein:

FIG. 1 is a perspective view of a talking book and its associated electronic circuit constructed according to this invention;

FIG. 2 is an exploded perspective view of the talking book with its associated battery pack removed; and FIG. 3 is a schematic diagram of the electronic circuit of the book.

DETAILED DESCRIPTION OF THE DRAWINGS

Illustrated generally in FIG. 1 is a talking book 10 in accordance with the present invention. The talking book 10 comprises a number of pages 12, covers 14 and 14A, and a binder 16 which carries the pages 12 and the covers. In the present specific example, a child's book is shown, and the covers and the pages contain words and/or pictures. An electronic circuit 18 is mounted in one cover (preferably in the back cover 14) and includes switches 22 and a speaker 24. As mentioned above, the pages 12 of the talking book 10 have words and/or pictures on them, and the pages 12 are sandwiched between the covers 14 and 14A; the binder 16 acts to hinge the pages 12 and the covers 14 and 14A together and to support a battery pack 28. Page 12A is preferably glued to the inside of cover 14 to conceal the electronic circuit 18.

In addition to the words and/or pictures on the pages 12, each page also contains at least one mark which in the present example is a round spot 26. The back cover contains a plurality of pressure-sensitive switches 22 which face the pages 12 and the spots 26 are aligned with the switches. Thus, when the book is resting with the back cover 14 on a support surface, such as a table, and at least some of the pages are flat against the back cover, the spots 26 are aligned with and overlie the switches 22. Since the switches are spaced from each other, the spots are out of the alignment on the pages. Consequently, when finger pressure is applied on a spot 26 on a selected page, the pressure is transferred through the selected page and intervening pages to the switch 22 which is below the spot.

In the present specific example, the switches are located in a row adjacent the outer edge of the back cover 14, and the spots 26 are along the edges of the pages, but of course the spots and the switches could instead be located in the center areas of the pages and the binder. There may be one spot and one switch for each page, but of course two o more pages may utilize a single switch and have aligned spots.

The user of the talking book 10 opens the cover 14A to expose a page 12. By depressing the spot 26 located on the selected page 12 or by pinching the spot 26 against the back cover 14, the associated pressure-sensitive switch 22 closes and activates a voice chip 20 to "read" the words on the associated page 12 or to make a sound. The voice chip 20 sends a signal to a speaker 24 mounted in the back cover 14 which forms the sound.

FIG. 3 is a schematic illustration of the electronic circuit 18. A voice chip unit 20 contains a plurality of voice chips; the unit 20 may have a conventional construction except for the words or sounds programmed in the chips. The unit 20 includes a plurality of ports or terminals 20a etc., and a plurality of switches 22a–22k are connected across pairs of the ports. For example, the switch 22a is connected across the ports 20a and 20d, and closure of the switch 22a activates a voice chip connected to the ports 20a to 20d. The switches 22a to 22k are of course the pressure-sensitive switches 22 shown in FIG. 1.

The audio unit 29 includes the speaker 24 (FIGS. 1 and 3) which is connected in series with a DC power supply 34 and a transistor 36. The base of the transistor is connected to a port 20h of the chip unit 20, and the above series circuit is connected between ground and a port 20i. When a selected voice chip is activated by closing a switch 22a to 22i, the transistor 36 is biased on and an audio frequency sound signal is fed to the speaker 24. Filter capacitors 30 and 32 are connected across the speaker to improve the sound quality.

The circuit further includes a clock generator or oscillator including a crystal 38 and two capacitors 40 connected across two ports 20j and 20k. A DC power supply is connected across two ports 20l and 20m and includes a battery 42, a resistor 44 and a capacitor 46 connected in series, and a manually operable switch 48 connected in parallel with them. When the switch 48 is closed, a DC charge builds up on the capacitor 46 and appears on the port 20l, thus energizing the circuit.

The DC supplies 34 and 42 are formed by a battery pack 28 mounted in the book. As shown in FIGS. 1 and 2, the pack 28 is preferably mounted in the binding 16 and includes a case 29 around the batteries 29a so that the batteries may easily be removed and replaced by sliding batteries in the top of the book and snapping cover 80. The case 29 and the binding 16 include conventional battery terminals (not shown).

With reference to FIG. 1, wires 52 connect the battery pack 28 with the unit 20 and wires 54 connect the unit 20 with the speaker 24. The wires 52 and 54 are preferably embedded in the back cover 14. The unit 20 preferably also includes a circuit 56 which is connected to the voice chips and includes a timer. The circuit 56 responds to the situation where one of the voice chips has not been activated for a period of, for example, fifteen seconds. After this period of inactivity, the circuit 56 automatically shuts off the circuit to conserve battery power. The circuit 56 may also include a voice chip which makes a statement such as "don't forget to put me away" after a predetermined time (possibly 20 sec.) has elapsed when no switch is depressed. After this statement the circuit is completely shut off.

It will be apparent from the foregoing that a novel and useful talking book has been provided. The book looks like most any hard bound book, is completely self-contained and is easily operated by a child. The switch 48 may be manually operated and, for example, be closed when the book is opened or actuated simultaneously with any other switch 22a to 22i. The marks on the pages may be along the edges of the pages as shown or may be in the center areas and be associated with pictures on the pages. For example, a mark on the nose of a dog may, when pressed, produce the bark of a dog. All of the electrical components (except for the batteries) are mounted in a single cover which simplifies the manufacture of the book. The back cover is preferred because it may be supported on a table, for example, and a child does not have to hold this weight when "reading" the book.

I claim:

1. Apparatus comprising:
   (a) a book including a plurality of pages;
   (b) a power source mounted in said book;
   (c) at least one voice chip mounted in said book;
   (d) audio means mounted in said book and connected to receive signals from said voice chip; and
   (e) at least one pressure-sensitive switch associated with one of said pages and operable to activate said voice chip to send audio reproducible signals to said audio means, and said pressure-sensitive switch is activated be pressing a mark on a page, whereby the pressure on the page is transferred through the page to said pressure-sensitive switch.

2. Apparatus as recited in claim 1, wherein the power source is replaceable.

3. Apparatus as recited in claim 1, wherein said book further includes at least one cover, and said pressure-sensitive switch is mounted in the cover.

4. Apparatus as recited in claim 1, wherein said book further includes a cover, and said voice chip is mounted in said cover.

5. Apparatus as recited in claim 1, wherein said book further includes a cover, and said audio means is mounted in said cover.

6. Apparatus as recited in claim 1, wherein said book further includes a binding, and said power source is mounted in said binding.

7. Apparatus comprising:
   (a) a book including a plurality of pages;
   (b) a power source mounted in said book;
   (c) at least one voice chip mounted in said book;
   (d) audio means mounted in said book and connected to receive signals from said voice chip; and
   (e) switch means associated with one of said pages and operable to activate said voice chip to send audio reproducible signals to said audio means, wherein said book further includes a binding, and said power source is mounted in said binding.

8. Apparatus as recited in claim 7, wherein the power source is replaceable.

9. Apparatus as recited in claim 7, wherein said book further includes at least one cover, and said switch means is mounted in the cover.

10. Apparatus as recited in claim 7, wherein said switch means is a pressure-sensitive type.

11. Apparatus as recited in claim 10, wherein said switch means is activated by pressing on a page, whereby the pressure on the page is transferred through the page to said pressure-sensitive switch means.

12. Apparatus as recited in claim 7, wherein said book further includes a cover, and said voice chip is mounted in said cover.

13. Apparatus as recited in claim 7, wherein said book further includes a cover, and said audio means is mounted in said cover.

14. A talking book, comprising:
   (a) a plurality of pages;
   (b) a cover;
   (c) a binding which hinges said pages and said cover together;
   (d) a power source mounted within said book;
   (e) a voice chip mounted in said book;
   (f) a mark on at least one of said pages;
   (g) a pressure-sensitive switch mounted on said cover and vertically aligned with said mark and operable to activate said voice chip whereby said switch is activated by pressing on said mark and the pressure is transferred through the pages to said switch; and
   (h) audio means mounted in said book for deriving an audible output from signals stored in the voice chip upon operation of the switch.

15. A talking book as recited in claim 14, wherein said power source is concealed in said binding and said chip and said audio means are mounted in said cover.

16. A talking book as recited in claim 15, wherein a plurality of marks, switches and chips are provided, each of said marks being associated with one of said switches and chips.

17. A talking book, comprising:
(a) a plurality of pages;
(b) a cover;
(c) a binding which hinges said pages and said cover together;
(d) a power source mounted within said book;
(e) a voice chip mounted within said book;
(f) a mark on at least one of said pages;
(g) a switch mounted on said cover adjacent to said mark and operable to activate said voice chip; and
(h) audio means mounted within said book for deriving an audible output from signals stored in the voice chip upon operation of the switch;
wherein said power source is concealed in said binding and said chip and said audio means are mounted in said cover.

18. A talking book as recited in claim 17 wherein a plurality of marks, switches and chips are provided, each of said marks being associated with one of said switches and chips.

19. A talking book, comprising:
(a) a plurality of pages;
(b) a cover;
(c) a binding which fastens said cover and said pages together;
(d) a power source mounted in said binding;
(e) a plurality of voice chips mounted in said cover;
(f) marks formed on a plurality of said pages;
(g) a pressure-sensitive switch located in said cover and aligned with said mark and operable to activate said voice chips by connecting said chips to said power source; and
(h) audio means connected to said voice chips and mounted in said cover for deriving an audible output from signals stored in the voice chip upon operation of said switch.

20. A talking book as recited in claim 19, wherein a plurality of said switches are provided, and marks on different pages are associated with different switches.

21. A talking book as recited in claim 19 wherein one of said voice chips activates automatically after a predetermined time has elapsed when none of said switches has been operated and delivers a reminder statement.

22. A talking book as recited in claim 21 wherein said power source automatically disconnects said chips from said power source after a predetermined time has elapsed when none of said switches has been operated.

* * * * *

UNITED STATES PATENT AND TRADEMARK OFFICE
CERTIFICATE OF CORRECTION

PATENT NO. : 4,990,092

DATED : February 5, 1991

INVENTOR(S) : Charles A. Cummings

It is certified that error appears in the above-identified patent and that said Letters Patent is hereby corrected as shown below:

The sheet of drawings consisting of figure 3, as shown on the attached sheet, should be inserted.

At column 2, line 49, "o" should read --or--.

At column 3, line 16, "201" should read --20ℓ--;

line 21, "201" should read --20ℓ--.

In claim 1, line 11, "be" should read --by--.

Signed and Sealed this

Eighteenth Day of August, 1992

Attest:

DOUGLAS B. COMER

*Attesting Officer*   *Acting Commissioner of Patents and Trademarks*

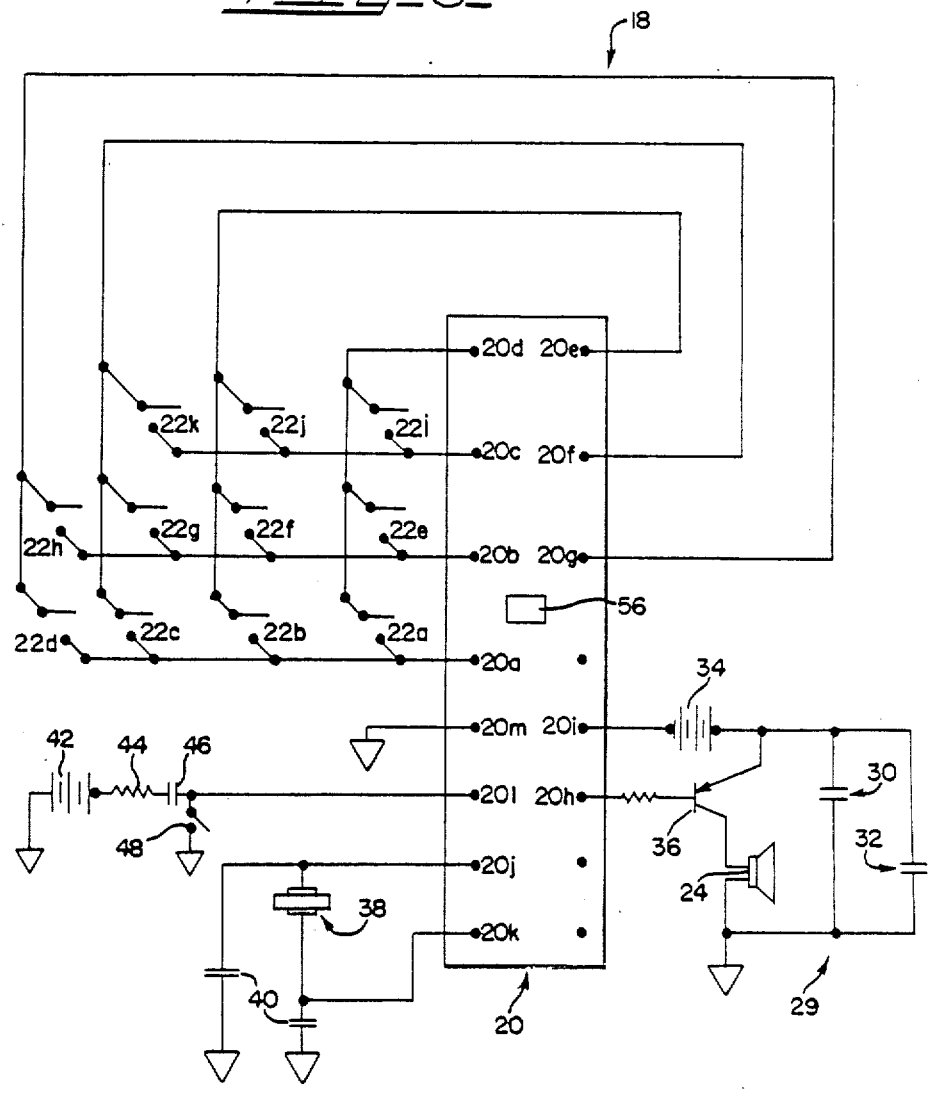

REEXAMINATION CERTIFICATE (3586th)

United States Patent [19]
Cummings

[11] B1 4,990,092
[45] Certificate Issued Aug. 4, 1998

[54] TALKING BOOK

[75] Inventor: Charles A. Cummings, Cincinnati, Ohio

[73] Assignee: Tonka Corporation, Minnetonka, Minn.

Reexamination Request:
No. 90/004,147, Feb. 15, 1996

Reexamination Certificate for:
Patent No.: 4,990,092
Issued: Feb. 5, 1991
Appl. No.: 393,511
Filed: Aug. 14, 1989

Certificate of Correction issued Aug. 18, 1992.

[51] Int. Cl.$^6$ .................................................. G09B 5/00
[52] U.S. Cl. ........................ 434/317; 434/339; 40/455
[58] Field of Search .................................. 434/317, 339, 434/335, 308; 40/455

[56] References Cited

U.S. PATENT DOCUMENTS

| | | |
|---|---|---|
| Re. 28,199 | 10/1974 | Deb et al. |
| 1,475,430 | 11/1923 | Curwen |
| 1,545,217 | 7/1925 | Thurber |
| 1,670,254 | 5/1928 | Gowin |
| 2,277,318 | 3/1942 | Grant |
| 2,444,355 | 6/1948 | Kniznick |
| 2,524,143 | 10/1950 | Smith |
| 2,826,844 | 3/1958 | Leika |
| 2,997,306 | 8/1961 | Hicks |
| 3,096,271 | 7/1963 | Hespenheide |
| 3,376,778 | 4/1968 | Musser |
| 3,522,665 | 8/1970 | Kalt |
| 3,529,832 | 9/1970 | Goetz et al. |
| 3,562,394 | 2/1971 | Kiepe |
| 3,699,294 | 10/1972 | Sudduth |
| 3,798,806 | 3/1974 | Sanford |
| 3,803,580 | 4/1974 | Shattuck |
| 4,044,229 | 8/1977 | Samreus |
| 4,055,014 | 10/1977 | Schmidt et al. |
| 4,096,577 | 6/1978 | Ferber et al. |
| 4,102,067 | 7/1978 | Tarrant |
| 4,158,264 | 6/1979 | Orth |
| 4,209,824 | 6/1980 | Kaufman |
| 4,222,188 | 9/1980 | Tarrant et al. |
| 4,236,156 | 11/1980 | Eden |
| 4,286,399 | 9/1981 | Funahashi et al. |
| 4,299,041 | 11/1981 | Wilson |
| 4,363,081 | 12/1982 | Wilbur |
| 4,497,126 | 2/1985 | Dejean |
| 4,531,310 | 7/1985 | Acson et al. |
| 4,616,213 | 10/1986 | Danish |
| 4,636,881 | 1/1987 | Brefka et al. |
| 4,656,469 | 4/1987 | Oliver et al. |
| 4,733,127 | 3/1988 | Takasu et al. |
| 4,755,789 | 7/1988 | Paschal |
| 4,795,861 | 1/1989 | O'Rourke |
| 4,809,246 | 2/1989 | Jeng |
| 4,818,827 | 4/1989 | Ipcinski et al. |
| 4,854,879 | 8/1989 | Chang |
| 4,884,974 | 12/1989 | DeSmet |
| 4,939,428 | 7/1990 | DePauli |
| 4,987,275 | 1/1991 | Miller et al. |

FOREIGN PATENT DOCUMENTS

| | | |
|---|---|---|
| 2625011 | 6/1989 | France |
| 669 760 A5 | 4/1989 | Switzerland |
| WO 81/02215 | 8/1981 | WIPO |

OTHER PUBLICATIONS

"The Learning Path," Texas Instruments New Educational Products for 1988.

*Primary Examiner*—Joe H. Cheng

[57] ABSTRACT

A talking book including a power source, switches, voice chips and speaker, all of which are mounted within the book and act together to "read" the words written on pages of the book. The switches are pressure-sensitive types, and marked areas on the pages are pressed in order to activate the switches and the chips in order to produce words or other sounds.

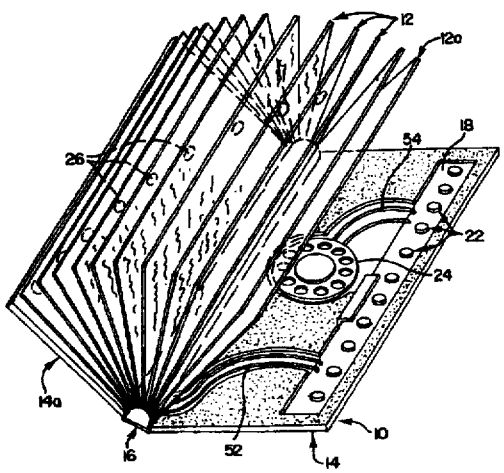

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–22 are confirmed.

Claim 3 is cancelled.

Claims 1 and 4–6 are determined to be patentable as amended.

Claim 2 dependent on an amended claim, is determined to be patentable.

New claims 23 and 24 are added and determined to be patentable.

1. Apparatus comprising:
   (a) a book including a plurality of pages *and a cover*;
   (b) a power source mounted in said book;
   (c) at least one voice chip mounted in said book;
   (d) audio means mounted in said book and connected to receive signals from said voice chip; [and]
   (e) at least one pressure-sensitive switch *mounted in said cover and* associated with one of said pages and operable to activate said voice chip to send audio reproducible signals to said audio means, and said pressure-sensitive switch is activated by pressing a mark on a page, whereby the pressure on the page is transferred through the page to said pressure-sensitive switch; *and*
   *(f) a binding which hinges said pages and said cover together.*

4. Apparatus as recited in claim 1, wherein [said book further includes a cover, and] said voice chip is mounted is said cover.

5. Apparatus as recited in claim 1, wherein [said book further includes a cover, and] said audio means is mounted in said cover.

6. Apparatus as recited in claim 1, wherein [said book further includes a binding, and] said power source is mounted in said binding.

*23. Apparatus comprising:*
   *(a) a self-contained book including a plurality of pages, a cover, and a binding which hinges said pages and said cover together, at least one of said pages having a mark disposed thereon;*
   *(b) a power source mounted in said book;*
   *(c) at least one voice chip mounted in said book;*
   *(d) audio means mounted in said book and connected to receive signals from said voice chip; and*
   *(e) at least one pressure-sensitive switch associated with one of said pages and operable to activate said voice chip to send audio reproducible signals to said audio means, said one pressure-sensitive switch being aligned with said mark on said one page through at least one intervening page so that said mark on said one page overlies said at least one intervening page and said one pressure-sensitive switch, said pressure-sensitive switch being activated by pressing said mark on said one page, whereby the pressure on said mark on said one page is transferred through said one page and said at least one intervening page to said one pressure-sensitive switch.*

*24. Apparatus comprising:*
   *(a) a self-contained book including a plurality of pages and a binding which hinges said pages together, at least one of said pages having a mark disposed thereon;*
   *(b) a power source mounted in said book;*
   *(c) at least one voice chip mounted in said book;*
   *(d) audio means mounted in said book and connected to receive signals from said voice chip; and*
   *(e) at least one pressure-sensitive switch associated with one of said pages and operable to activate said voice chip to send audio reproducible signals to said audio means, said one pressure-sensitive switch being aligned with said mark on said one page through at least one intervening page so that said mark on said one page overlies said at least one intervening page and said one pressure-sensitive switch, said pressure-sensitive switch being activated by pressing said mark on said one page, whereby the pressure on said mark on said one page is transferred through said one page and said at least one intervening page to said one pressure-sensitive switch.*

* * * * *